United States Patent [19]

Brokaw

[11] 4,441,824

[45] Apr. 10, 1984

[54] PORTABLE WASTE AGITATOR

[76] Inventor: Kim C. Brokaw, 701 N. Birch St., Monticello, Iowa 52310

[21] Appl. No.: 521,513

[22] Filed: Aug. 8, 1983

Related U.S. Application Data

[63] Continuation of Ser. No. 286,147, Jul. 23, 1981, abandoned.

[51] Int. Cl.³ .............................................. B01F 5/12
[52] U.S. Cl. ..................................... 366/266; 366/319
[58] Field of Search .................. 366/81, 262, 263, 264, 366/265, 266, 267, 268, 269, 270, 319, 325, 327, 329, 330, 243, 244, 241

[56] References Cited

U.S. PATENT DOCUMENTS

| 1,387,986 | 1/1971 | Love . | |
|---|---|---|---|
| 1,864,149 | 6/1932 | Rockwell | 366/266 |
| 2,038,221 | 4/1936 | Kagi | 366/266 |
| 3,235,232 | 2/1966 | Conover | 366/270 |
| 3,329,409 | 7/1967 | Raleigh | 366/266 |
| 4,089,620 | 5/1978 | Ravitts | 366/270 |
| 4,329,069 | 5/1982 | Graham | 366/270 |

FOREIGN PATENT DOCUMENTS 1387986   3/1975   United Kingdom ............... 366/264

*Primary Examiner*—Robert W. Jenkins
*Attorney, Agent, or Firm*—Allan L. Harms

[57] ABSTRACT

Portable apparatus for agitation of animal waste materials collected in a livestock confinement pit which can be inserted into tubes passing through the sidewall of the pit is disclosed. An elongated housing in which is mounted a high speed propulsion screw and a hydraulic drive mechanism is shown. Openings are provided in said housing to allow intake into the enclosure above said propulsion member and an exhaust opening is located in said housing at the lower end of the housing adjacent said propulsion member. A method for intermixing of solid and liquid animal wastes contained within a confinement facility collection pit is described.

11 Claims, 3 Drawing Figures

PORTABLE WASTE AGITATOR

CROSS REFERENCE TO OTHER APPLICATION

This application is a continuation of application Ser. No. 286,147, filed July 23, 1981, now abandoned.

This application is filed concurrently with Ser. No. 286,148 filed July 23, 1981 of Kim C. Brokaw and Scott W. Graham entitled Apparatus for Agitation of Waste Material.

BACKGROUND OF THE INVENTION

It is now frequent practice for persons engaged in livestock production to house livestock in an enclosed building, frequently referred to as a livestock confinement facility. The confinement facility provides a floor upon which the livestock is confined and includes a pit under part or all of the floor for collection of animal feces and urine. The floor over the pit is provided with openings to allow the drop of waste material into the pit. Normally, the solids fall to the bottom of the pit creating a thick sludge. As time progresses, the pit fills, presenting an emptying problem.

In some confinement facilitates, the collection pit is enlarged to provide a section of pit which is outside the walls of the building above. This section is provided with a large lid hatch, which can be opened or removed to allow introduction of a device into the pit cavity. Such devices typically include a cutting device at the lower end to loosen the precipitated solids and sludge, and a suction mechanism for removal of the waste material into a portable tank. Such removal devices are large and bulky and necessitate an extension of the pit from beneath the building itself.

In other facilities, no extension of a pit wall is made and the entry into the pit is gained by removal of sections of floor inside the building for introduction of the cutting and suction device into the pit. Naturally, the operation of the facility is interrupted for purposes of access to the floor above the pit.

In other facilities, tubes are installed at the time of construction into the side walls of the pits at intervals, usually in slanting fashion. These provide access to the pit area from outside the confinement facility, though the access is usually limited to devices of less than twelve inches in diameter. To empty such pits, suction is sometimes employed to remove the liquid portion. However, suction alone is insufficient to withdraw the solid on the bottom of the pit, and only an incomplete withdrawal can be completed. In order to better empty the pit, devices have been developed which agitate the solids by withdrawal of liquid material through suction and reintroduction under pressure of the liquid material through an adjacent tube to cause agitation and slurry of the solids. Such devices are of limited effectiveness. The instant invention addresses and solves the problem of agitation of solids into a slurry with the liquid manure when the confinement facility pit is equipped with only tubes leading through the side walls of the pit.

SUMMARY OF THE INVENTION

The instant invention relates to the removal of animal waste from waste pits located beneath facilities which confine agricultural livestock. Apparatus is provided which serves to agitate solid portions of animal wastes in such collection pits beneath such livestock facilities. An elongated housing is provided which houses a propulsion assembly, a driving means to propel the propulsion assembly, and transfer means for transfer of energy to said driving means from an external source. Connection means for a connection of the external energy source to the transfer means is provided. Intake openings and discharge openings are provided in said housing. Said propulsion assembly comprises a shaft section, a conveyor section and an impeller section.

One objective of the invention is to provide apparatus to agitate solids in an animal waste collection pit to facilitate emptying of the pit.

Another objective of the invention is to provide apparatus which may be introduced into an opening to a waste collection pit which is of limited size or diameter.

Another objective is to provide apparatus for agitation of waste solids in a confinement facility collection pit, which apparatus may be installed and removed by one person.

Another objective is to provide apparatus for agitation of solid waste in a collection pit which is portable and can be moved without auxiliary equipment.

Another objective is to provide apparatus for agitation of solid waste in a collection pit which can be used in conjunction with suction means for removal of pit contents.

Another objective is to provide apparatus which employs liquid portions of the collected waste to agitate the solid portions of the collected waste within the waste collection pit.

Another objective is to provide apparatus which will agitate solids within a waste collection pit when said pit is only partially filled.

Another objective is to provide apparatus which can be operated from a hydraulic system of a farm or other tractor.

Another objective is to provide apparatus for agitation of solids within a waste collection pit which maintains cooling of its driving means while in operation.

Another objective is to provide apparatus for agitation of solids within a waste collection pit which apparatus is partially lubricated by the materials being agitated.

Another objective is to provide apparatus for agitation of solids in a waste collection pit which can be used with a minimum of filth contamination of the user.

Another objective is to provide apparatus for agitation of solid wastes in a waste collection pit which can be used with a minimum of injury risk to the user.

Another objective is to provide apparatus for agitation of solid wasted in a waste collection pit which can be inserted and removed by one person.

These objectives and others will be apparent from the ensuing description.

DETAILED DESCRIPTION OF THE INVENTION

Figure 1:
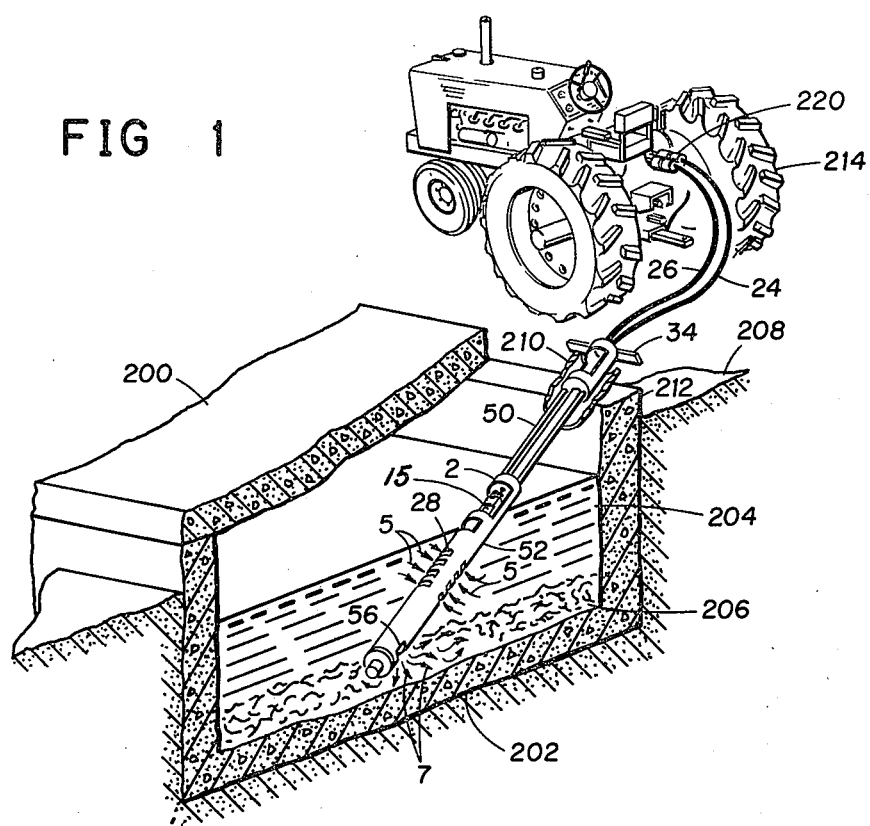
FIG. 1 is a perspective of the invention in use in a livestock confinement facility, the facility being shown in partial section.

Referring to the drawings, FIG. 1 shows invention 2 installed in a collection pit 202, which is part of confinement facility 200. Access port 210 extends through side wall 212 of pit 202. Pit 202 is located within earth 208. Upper end 50 of invention 2 is located within access port 210 while lower end 52 is partly submerged in liquid waste 204 and extends into solid waste 206. Bar 34 of upper end 50 abuts access port 210 to mechanically prevent further insertion of invention 2 into access port 210. Hydraulic lines 24 and 26 interconnect hydraulic connection 220 of tractor 214 to invention 2. In operation, liquid waste 204 flows into intake openings 28 of invention 2 in the direction of arrows 5 and emanates under pressure from exhaust opening 56 of invention 2 in the direction of arrows 7. Solid waste 206 is thereby agitated by introduction of liquid waste 204 into it.

Motor 15 is disposed along invention 2 within lower end 52 such that it is in touching contact with liquid waste 204 as shown in FIG. 1. Cooling of motor 15 is accomplished by said contact. Bars 6 and 10 extend from lower end 52 of invention 2 to engage access port 210. As shown, the cross sectional area of all intake openings 28 exceeds the cross sectional area of exhaust opening 56.

Figure 2:
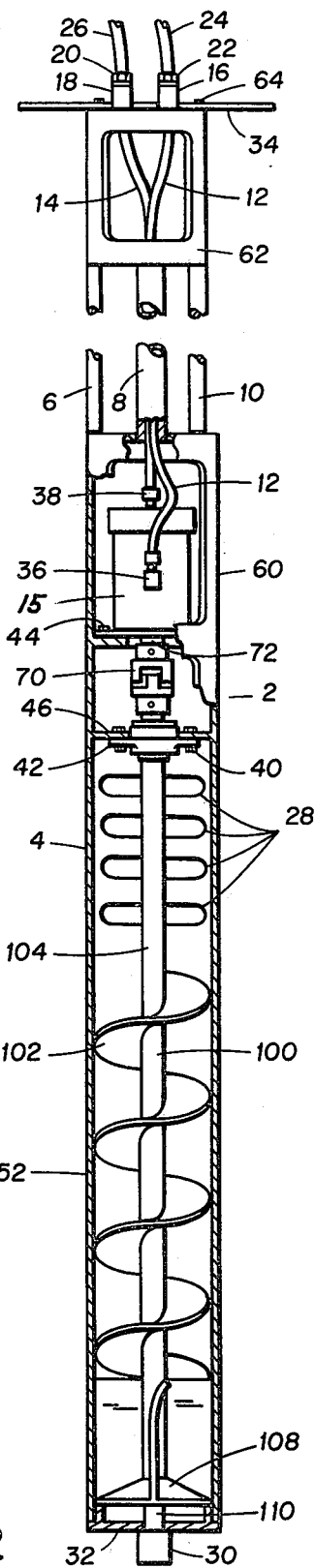
FIG. 2 is a front view of the invention in partial section.

Referring now to FIG. 2, invention 2 is shown in partial section. Lower end 52 of elongated housing 4 terminates with cover 32. Intake openings 28 are located in housing 4. Propulsion member 100 is positioned within housing 4. Shaft 104 engages bearing housing 42 installed on support 46 and terminates with flexible coupler 70. Flexible coupler 70 is mounted to motor driveshaft 72 extending from motor 15. Motor 14 must be capable of high speed rotation of propulsion member 100. Lower end 110 of propulsion member 100 engages cover 32 and bearing enclosure 30. Motor 15 is mounted in housing 4 by mounting screw 44 and is equipped with connections 36 and 38. Tube 8 extends from motor enclosure 60 to connector enclosure 62. Bar 34 is affixed by screws 64 to connector enclosure 62. Flexible tubes 12 and 14 engage connections 36 and 38 respectively and pass from motor enclosure 60 through tube 8 into connector enclosure 62 and terminate in extensions 16 and 18, which are affixed to plate 34. External connections 22 and 20 mount hydraulic lines 24 and 26 to extensions 16 and 18 respectively. Bars 6 and 10 extend from connector enclosure 62 to motor enclosure 60.

Figure 3:
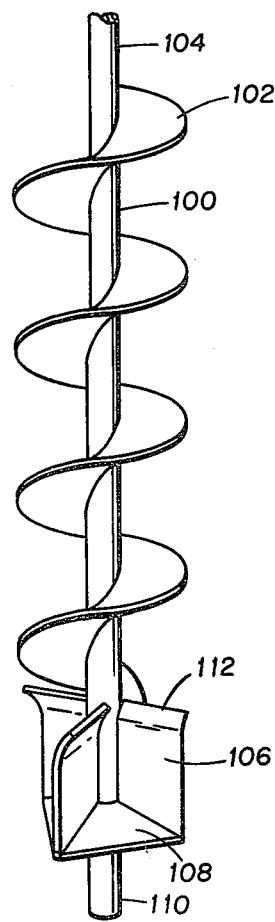
FIG. 3 is a perspective of the propulsion member of the invention.

Referring now to both FIGS. 2 and 3, screw flighting 102 is installed on shaft 104 of propulsion member 100 and terminates in impeller blades 106. Each impeller blade has angled extension 112 and resides adjacent deck 108.

Having thus described the invention, I claim:

1. Portable apparatus for agitation of waste solids within a livestock confinement facility collection pit, comprising
   a portable elongated tubular housing having a first end and a second end
   a plurality of bars extending from the first end of said housing,
   a top plate mounted to the ends of said bars,
   a propulsion member mounted within said housing,
   a hydraulic piston motor mounted within said housing adjacent to the first end thereof,
   said propulsion member comprising
      a driven shaft depending from said motor,
      screw flighting mounted to said driven shaft along a portion thereof,
      impeller blades mounted to said shaft,
   a plurality of openings along said housing from the first end thereof to a point midway along said housing,
   an opening in the sidewall of said housing adjacent the impeller portion of said propulsion member,
   an end cap on the second end of said housing,
   a plurality of fluid conducting members interconnecting said motor and said top plate,
   a plurality of fluid conducting interconnectors mounted in said top plate and passing therethrough.

2. The invention of claim 1 wherein
   said motor rotates said propulsion member at a high speed,
   the cross sectional area of said plurality of openings along said housing is greater than the cross sectional area of said opening adjacent said impeller portion.

3. Apparatus for intermixing waste solids with waste liquids collected in a livestock confinement facility collection pit having access ports in the sidewall thereof, the invention comprising
   an elongated housing having a first end and a second closed end and having intake and discharge openings therein,
   said discharge opening located adjacent to the second end of said housing,
   said intake openings located between the first end and second end of said housing,
   bars extending from said first end of said housing,
   a propulsion member mounted within said housing,
   a drive mechanism attached to said propulsion member and mounted within said housing,
   means to energize said drive mechanism,
   said drive mechanism comprising a hydraulic motor,
   said propulsion member comprising a driven shaft depending from said motor,
   screw flighting mounted upon said driven shaft along a portion thereof,
   axially extending blades depending from said driven shaft upon the lower portion thereof and adjacent said discharge opening.

4. The invention of claim 3 wherein said motor is capable of rotating said propulsion member within said housing at high speed.

5. The invention of claim 3 wherein said axially extending blades have angled extensions thereon.

6. The invention of claim 3 wherein said driven shaft engages a bearing enclosure mounted within said second closed end.

7. Apparatus to assist removal of livestock waste collected in a pit beneath a livestock confinement facility, comprising
   an elongated tubular housing having a lower closed end,
      said lower closed end having a bearing enclosure centrally located thereupon,
   a hydraulically driven motor mounted within said tubular housing,
   a rotatable elongated shaft depending from said motor,
      said shaft having screw flighting mounted upon a portion thereof,
      said shaft having a plurality of axially extending blades mounted upon a portion thereof adjacent the screw flighting,
      said blades each having an angled extension thereon,
      said blades terminating in a deck having a substantially square shape, said shaft extending from said deck and engaging said bearing enclosure, said housing having a discharge opening therein adjacent to said blades, said housing having a plurality of intake openings therein adjacent to said shaft.

8. The invention of claim 7 wherein said motor is mounted within said housing such that said motor is in touching contact with liquid waste during operation.

9. The invention of claim 7 wherein bars extend from said housing such that said housing may be immersed in the liquid waste within said pit.

10. Apparatus for insertion through sidewall access ports of a livestock confinement facility waste collection pit to intermix liquid and solid waste therein, comprising an elongated housing having an upper end and a lower end, a plurality of bars extending from said upper end of said housing said housing being disposed fully within said wastes of said pit, said bars having upper ends disposed through said sidewall access port and extending therefrom, a motor mounted within the upper end of said housing, said motor being capable of operating while touching liquid waste, a driven shaft depending from said motor, said shaft having a lower end, screw flighting affixed to said driven shaft along a portion of the length thereof, a plurality of impeller blades axially affixed to said driven shaft along the lower end thereof, a substantially square terminating deck affixed to said impeller blades, said housing having a plurality of openings in the wall thereof disposed adjacent said motor and said driven shaft, said housing having an opening in the wall thereof disposed adjacent the impeller blades of said shaft, said housing having a cover over the lower end thereof, said cover having a bearing housing therein, said lower end of said shaft engaging said bearing housing.

11. The invention of claim 10 wherein a top bar is affixed in substantially perpendicular arrangement to said bars at the upper ends thereof.

* * * * *